(12) United States Patent
Chou

(10) Patent No.: US 6,574,772 B1
(45) Date of Patent: Jun. 3, 2003

(54) EFFICIENT GALOIS FIELD MULTIPLIER STRUCTURES FOR ERROR-CORRECTION ENCODING AND DECODING

(75) Inventor: Jim C. Chou, Berkeley, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/498,589

(22) Filed: Feb. 4, 2000

(51) Int. Cl.[7] .............................................. H03M 13/15
(52) U.S. Cl. ...................................................... 714/784
(58) Field of Search ........................................ 714/784

(56) References Cited

U.S. PATENT DOCUMENTS

| | | | | |
|---|---|---|---|---|
| 4,777,635 A | * | 10/1988 | Glover | 714/756 |
| 5,130,990 A | * | 7/1992 | Hsu et al. | 714/784 |
| 5,272,661 A | * | 12/1993 | Raghavan et al. | 708/492 |
| 5,291,496 A | * | 3/1994 | Andaleon et al. | 714/703 |
| 5,377,207 A | * | 12/1994 | Perlman | 714/784 |
| 5,396,502 A | * | 3/1995 | Owsley et al. | 708/492 |
| 5,787,099 A | * | 7/1998 | Lan et al. | 714/781 |
| 6,263,471 B1 | * | 7/2001 | Huang | 714/784 |
| 6,343,305 B1 | * | 1/2002 | Ko.cedilla. et al. | 708/492 |
| 6,378,104 B1 | * | 4/2002 | Okita | 714/774 |

OTHER PUBLICATIONS

McGregor et al., "Implementing the Reed–Solomon Code: A Case Study", IEE Colloquium on Signal Processing Applications of Finite Field Mathematics, Jun. 1989, pp. 7/1–7/8.*

Paar et al., "Comparison of Arithmetic Architectures for Reed–Solomon Decoders in Reconfigurable Hardware", Proceedings 5th Annual IEEE Symposium on Field–Programmable Custom Computing Machines, Apr. 1997, pp. 219–225.*

Furness et al., "Generalised Triangular Basis Multipliers for the Design of Reed–Solomon Codecs", 1997 IEEE Workshop on Signal Processing Systems, Nov. 1997, pp. 202–211.*

Furness et al., "GF(2 m) Multiplication over Triangular Basis for Design of Reed–Solomon Codes", IEE Proceedings—Computers and Digital Technology, vol. 145, No. 6, Nov. 1998, pp. 437–443.*

Paar, Christof; Fleischmann, Peter; Roelse, Peter; "Efficient Multiplier Architectures for Galois Fields $GF(2^{4n})$", IEEE Transactions on Computers, vol. 47, No. 2, Feb. 1998.

* cited by examiner

*Primary Examiner*—Stephen M. Baker
(74) *Attorney, Agent, or Firm*—McAndrews, Held & Malloy, Ltd.

(57) ABSTRACT

A communication system employing Reed-Solomon error-correction coding which comprises an encoder (12) and a decoder (22). Either the encoder or decoder may be compatible with a first field polynomial selected to reduce the number of logic gates in the encoder or decoder. Before decoding, a converter (20) converts the code from a form compatible with a first field polynomial to another form compatible with a second field polynomial.

20 Claims, 2 Drawing Sheets

EFFICIENT GALOIS FIELD MULTIPLIER STRUCTURES FOR ERROR-CORRECTION ENCODING AND DECODING

BACKGROUND OF THE INVENTION

This invention relates to communication systems employing polynomial-generated error-correction encoding, and more particularly relates to encoding and decoding techniques for reducing the number of logic gates used in such systems.

Polynomial-generated error-correction coding, such as Reed-Solomon coding, requires encoders and decoders with many gates. Most of the gates are allocated to Galois field multiplier structures. By using certain field polynomials for the Galois field multiplier structures, the number of gates can be reduced. However, the field polynomial which enables gate reduction is frequently incompatible with other parts of the encoder or decoder system which are made with commercially available parts. As a result, there is a need for a system of converting a code compatible with one field polynomial to a code compatible with another field of polynomial which enables a reduction in the number of gates used in the encoders or decoders. This invention addresses the problem and provides a solution.

BRIEF SUMMARY OF THE INVENTION

The preferred embodiment is useful on a communication system employing polynomial-generated error-correction coding using encoders and decoders which comprise logic gates. In such an environment, according to a first embodiment of the invention, code words of a first form compatible with a first field polynomial selected to reduce the number of the logic gates are generated, preferably by an encoder. Code words of a second form compatible with a second field polynomial are decoded, preferably by a decoder. The code words of the first form are converted to code words of the second form before the code words of the second form are decoded.

According to a second embodiment of the invention, code words of a first form compatible with a first field polynomial are generated, preferably by an encoder. Code words of a second form compatible with a second field polynomial selected to reduce the number of logic gates are decoded, preferably by a decoder. The codes words of the first form are converted to code words of the second form before the code words of the second form are decoded by the decoder.

Using the foregoing techniques, systems employing field polynomials selected to reduce the number of logic gates can be made compatible with systems also employing encoders or decoders that use other field polynomials. As result, polynomial-generated error-correction coding systems can be customized to increase efficiency and reduce overall costs.

DETAILED DESCRIPTION OF THE PREFERRED EMBODIMENTS

Figure 1:
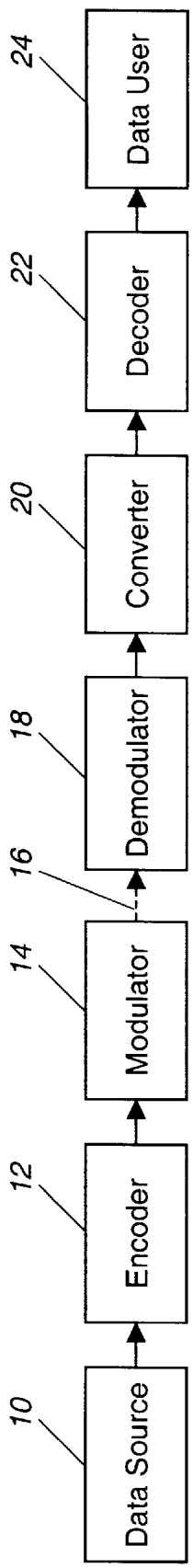
FIG. 1 is a schematic block diagram of a preferred form of a communication system made in accordance with the invention.

Referring to FIG. 1, a preferred embodiment of the invention comprises a data source 10 which transmits conventional communication data to a Reed-Solomon encoder 12 employing polynomial-generated error-correction coding and also comprising logic gates that are operable to generate code words of a first form compatible with a first field polynomial selected to reduce the number of the logic gates. The first field polynomial may be selected as described in "Efficient Multiplier Architectures for Galois Fields $Gf(2^{4n})$" by Christof Paar et al., IEEE Transactions on Computers, Vol. 47, No. 2, February 1998.

The Reed-Solomon code words generated by encoder 12 are transmitted to a conventional modulator 14. The modulated signals are then transmitted over a conventional communication medium 16, such as wires, optic fibers, or an atmospheric communication channel. The transmitted signals are received by a conventional demodulator 18 and, after demodulation, are transmitted to a converter 20. In a manner explained later, converter 20 converts the code words from the first form compatible with the field polynomial used by encoder 12 to a second form compatible with a second field polynomial used by a Reed-Solomon decoder 22 which may employ commercially available off-the-shelf components, including decoding gates, which are compatible with the second field polynomial. The converted code words are then sent to decoder 22 which uses the second field polynomial to generate data useful to a data user 24, which may comprise communication equipment or computer equipment that employs the data originally received from source 10.

As an alternative embodiment, decoder 22 may include logic gates operable to decode code words of a form compatible with a field polynomial selected to reduce the number of logic gates in decoder 22. In such an environment, encoder 12 uses a first field polynomial in order to encode data from source 10 according to a Reed-Solomon code. According to the alternative embodiment, encoder 12 may use commercially-available off-the-shelf components, including encoding gates, which are compatible with the first field polynomial. Converter 20 then converts the code generated by encoder 12, which is compatible with the first field polynomial, to a code which is compatible with a second field polynomial used by decoder 22 in order to reduce the number of logic gates in decoder 22.

The first and second field polynomials used by encoder 12 and decoder 22, as well as the construction and operation of converter 20, are explained in terms of Galois field arithmetic in the following section of this specification.

A Galois field is like any other field in that all of the elements within the field are closed under "addition" and "multiplication." The operations of addition and multiplication, however, are defined over a polynomial, typically known as the field polynomial. Typically, the field polynomial will be monic and irreducible over GF(2) and will be of order-m, so that it can be extended to $GF(2^m)$. Using $\alpha$, $GF(2^m)$ can be constructed by defining all of the elements in the field in terms of a basis of elements, $[\alpha^0, \alpha^1, \alpha^2, \ldots, \alpha^{m-1}]$. For example, the typical field polynomial used to define $GF(2^8)$ is given as:

$$p(X)=X^8+X^4+X^3+X^2+1 \tag{26}$$

Now, if a is defined to be a zero of p(X), then we have $$p(\alpha)=\alpha^8+\alpha^4+\alpha^3+\alpha^2+1=0 \rightarrow \alpha^8=\alpha^4+\alpha^3+\alpha^2+1 \tag{27}$$

Any element in $GF(2^8)$ then can be defined by the field polynomial as a linear combination of $[\alpha^0, \alpha^1, \ldots, \alpha^7$. The field element, $\alpha^8$, is derived from (27) and all other field elements also are derived in a similar manner from the field polynomial. All of the field elements (except 0) from GF(256) can be represented as ac where i is an integer between 0 and 254. This is useful for multiplication between field elements:

$$\alpha^1 \alpha = \alpha^{i+j} \quad (28)$$

The integer representation of the field elements is simply given by the expansion of the basis elements (i.e., $\alpha^0=1$, $\alpha^8=29$). Thus, multiplication of the integer representations of the field elements does not correspond to multiplication over the field GF(256).

The addition of any two field elements from GF(256) can be done as an addition over GF(2) of each of the bits in the bit-representation of the field elements. This amounts to a simple XOR of each of the 8 bits of the field elements to be added.

To understand how the multiplication of two elements from GF(256), $a=\alpha$ and $b=\alpha^j$ works, each element is represented as a polynomial over GF(2) (i.e., $\alpha(x)$ and $\alpha(x)$ respectively):

$$\alpha(x) = \alpha_0 x^0 + \alpha_1 x^1 + \ldots + \alpha_7 x^7 \quad (29)$$

$$b(x) = b_0 x^0 + \alpha_1 x^1 + \ldots b_7 x^7 \quad (30)$$

The coefficients of the polynomial are simply the coefficients of the basis expansion for the element. The multiplication of the two elements then is the multiplication of the two polynomials modulo the field polynomial:

$$c(x) = \alpha(x) b(x) \bmod p(x) = \alpha^{i+j} \quad (31)$$

where the last equality in (31) follows from (28). An architecture for implementing the multiplication follows from the solution to each of the 8 coefficients of c(x) in terms of the $\alpha'_i$s and $b'_j$s. For example, the solution to the first coefficient of c(x) is:

$$c_0 = \alpha_0 b_0 + \alpha_7 b_7 + \alpha_6 b_7 + \alpha_7 b_6 + \alpha_5 b_7 + \alpha_6 b_6 + \alpha_7 b_5 + \alpha_1 b_7 + \alpha_2 b_6 + \alpha_3 b_5 + \alpha_4 b_4 + \alpha_5 b_3 + \alpha_6 b_2 + \alpha_7 b_1 \quad (32)$$

where $\alpha_i b_j$ is implemented as an AND gate between the two bits, $\alpha_i$, $b_j$ and $\alpha_i + b_j$ is implemented as XOR gate between the two bits. The above architecture using the field polynomial that is defined in (26) is not optimal in terms of minimizing the number of gates used. A more efficient architecture comes from the realization that GF(256) can be generated from many different field polynomials with each of the resulting fields being isomorphic. C. Paar, et al. in "Efficient Multiplier Architectures for Galois Fields GF($2^{4n}$)," IEEE Trans. on Computers, voL 47, pp. 162–170, February 1998, describe field polynomials that produce a minimum number of gates for a multiplication over GF(256). The resulting field polynomial is given as a composite field. The composite field consists of taking an order-4 field polynomial with coefficients from GF(4) and constructing $GF((2^2)^4) = GF(256)$, whereas, before, an order-8 polynomial was used with coefficients from GF(2), to construct $GF(2^8) = GF(256)$. The new field polynomial is given as:

$$p_c(x) = x^4 + x^3 + w^2 x^2 + w \quad (33)$$

where w is the primitive element of the field polynomial, q(x), that defines GF(4):

$$q(x) = x^2 + x + 1 \quad (34)$$

$$q(w) = w^2 + w + 1 = 0 \rightarrow w^2 = w + 1 \quad (35)$$

The code words generated by encoder 12 which are compatible with a first field polynomial can be converted to a form compatible with a second field polynomial used by decoder 22 according to expressions (36)–(40).

To show that the field generated by p(x) is isomorphic to the field generated by $p_c(x)$, the following mapping is defined:

$$\Psi: GF(2^8) \rightarrow GF((2^2)^4) \quad (36)$$

The zero element must map to the zero element by the definition of an isomorphic map:

$$\Psi(0) = 0 \quad (37)$$

From (37) it follows that:

$$\Psi(\alpha^\kappa) = \beta^\kappa \kappa = 0, 1, \ldots, 254 \quad (38)$$

where $\alpha$ is the primitive element of p(x). Solving the above equations, $w = \alpha^{85\kappa}$ and $\beta = \alpha^{31\kappa}$. Therefore, the isomorphic map is completely defined by:

$$\Psi(\alpha^\kappa) = \alpha^{31\kappa} \quad (39)$$

The resulting architecture can be found by defining multiplication with respect to $p_c(x)$:

$$c(x) = \alpha(x) b(x) \bmod p_c(x) \quad (40)$$

where $\alpha(x)$ and $b(x)$ are now order-3 polynomials with coefficients from GF(4). As a result, after solving for $c_0$, $c_1$, $c_2$, $c_3$ in terms of the $\alpha'_i$ s, $b'_i$ s, product terms $\alpha_i b_j$ are evaluated using a GF(4) multiply, while additions are evaluated as usual.

Figure 2:
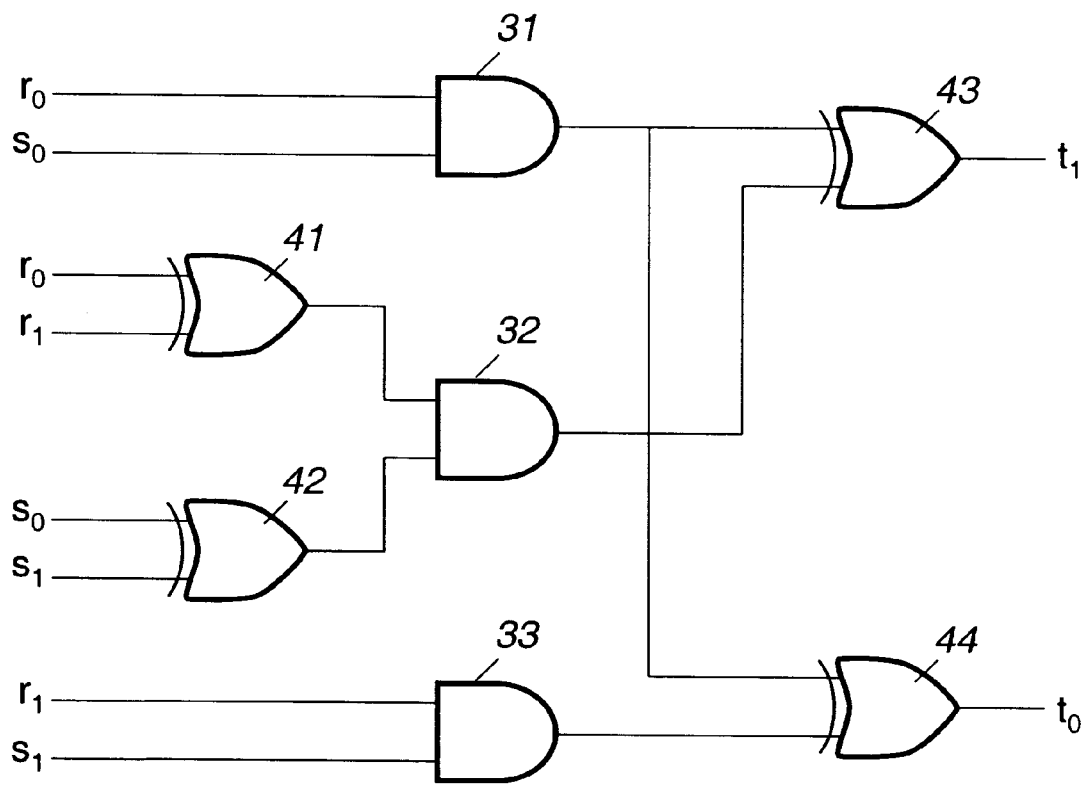
FIG. 2 is a schematic block diagram of a preferred form of logic gates used in the encoder or decoder shown in FIG. 1.

FIG. 2 illustrates logic gates suitable for use in encoder 12 or decoder 22. More specifically, FIG. 2 shows and gates 31–33 and exclusive OR gates 41–44. The gate arrangement of FIG. 2 may be used to implement a GF(4) multiple with field polynomial $q(x) = x^2 + x + 1$.

The embodiments described in connection with FIG. 1 illustrate preferred forms of the invention which may be altered and modified without departing from the true spirit and scope of the invention as defined in the accompanying claims.

What is claimed is:

1. In a communication system employing polynomial generated error-correction coding, apparatus comprising in combination:

an encoder comprising logic gates operable to generate code words of a first form compatible with a first field polynomial selected to reduce the number of said logic gates, said logic gates performing multiplication of polynomials of the form a(x) and b(x) by multiplication of the polynomials modulo said first field polynomial of the form a(x)b(x) mod p(x) where p(x) represents said first field polynomial;

a decoder operable to decode code words of a second form compatible with a second field polynomial; and a converter operable to convert said code words of the first form to code words of the second form before the code words of the second form are decoded by the decoder.

2. Apparatus, as claimed in claim 1, wherein said logic gates comprise AND gates and EXCLUSIVE OR gates.

3. Apparatus, as claimed in claim 1, wherein said converter comprises an isomorphic mapper.

4. Apparatus, as claimed in claim 1, wherein said coding comprises Reed-Solomon coding.

5. In a communication system employing polynomial generated error-correction coding, apparatus comprising in combination:
an encoder operable to generate code words of a first form compatible with a first field polynomial;
a decoder comprising logic gates operable to decode code words of a second form compatible with a second field polynomial selected to reduce the number of said logic gates, said logic gates performing multiplication of polynomials of the form a(x) and b(x) by multiplication of the polynomials modulo said second field polynomial of the form a(x)b(x) mod p(x) where p(x) represents said second field polynomial; and
a converter operable to convert the code words of the first form to code words of the a second form before said code words of the second form are decoded by the decoder.

6. Apparatus, as claimed in claim 5, wherein said logic gates comprise AND gates and EXCLUSIVE OR gates.

7. Apparatus, as claimed in claim 5, wherein said converter comprises an isomorphic mapper.

8. Apparatus, as claimed in claim 5, wherein said coding comprises Reed-Solomon coding.

9. In a communication system comprising polynomial generated error-correction encoding apparatus comprising logic gates, a method comprising in combination:
generating code words of a first form compatible with a first field polynomial selected to reduce the number of said logic gates, said generating comprising multiplication of polynomials of the form a(x) and b(x) by multiplication of the polynomials modulo said first field polynomial of the form a(x)b(x) mod p(x) where p(x) represents said first field polynomial;
decoding code words of a second form compatible with a second field polynomial; and
converting said code words of the first form to code words of the second form before the code words of the second form are decoded.

10. A method, as claimed in claim 9, wherein said logic gates comprise AND gates and EXCLUSIVE OR gates.

11. A method, as claimed in claim 9, wherein said converting comprise isomorphic mapping.

12. A method, as claimed in claim 9, wherein said code words comprise Reed-Solomon code words.

13. In a communication system employing polynomial generated error-correction decoding apparatus comprising logic gates, a method comprising in combination:
generating code words of a first form compatible with a first field polynomial;
decoding code words of a second form compatible with a second field polynomial selected to reduce the number of said logic gates, said logic gates performing multiplication of polynomials of the form a(x) and b(x) by multiplication of the polynomials modulo said second field polynomial of the form a(x)b(x) mod p(x) where p(x) represents said second field polynomial; and
converting the code words of the first form to code words of the a second form before said code words of the second form are decoded by the decoder.

14. A method, as claimed in claim 13, wherein said logic gates comprise AND gates and EXCLUSIVE OR gates.

15. A method, as claimed in claim 13, wherein said converting comprises isomorphic mapping.

16. A method, as claimed in claim 13, wherein said code words comprise Reed-Solomon code words.

17. In a communication system employing polynomial generated error-correction coding, apparatus comprising in combination:
an encoder comprising logic gates including AND gates and EXCLUSIVE OR gates operable to generate code words of a first form compatible with a first field polynomial selected to reduce the number of said logic gates;
a decoder operable to decode code words of a second form compatible with a second field polynomial; and
a converter operable to convert said code words of the first form to code words of the second form before the code words of the second form are decoded by the decoder.

18. In a communication system employing polynomial generated error-correction coding, apparatus comprising in combination:
an encoder operable to generate code words of a first form compatible with a first field polynomial;
a decoder comprising logic gates including AND gates and EXCLUSIVE OR gates operable to decode code words of a second form compatible with a second field polynomial selected to reduce the number of said logic gates; and
a converter operable to convert the code words of the first form to code words of the a second form before said code words of the second form are decoded by the decoder.

19. In a communication system comprising polynomial generated error-correction encoding apparatus comprising logic gates, a method comprising in combination:
generating code words of a first form compatible with a first field polynomial selected to reduce the number of said logic gates, said logic gates comprising AND gates and EXCLUSIVE OR gates;
decoding code words of a second form compatible with a second field polynomial; and
converting said code words of the first form to code words of the second form before the code words of the second form are decoded.

20. In a communication system employing polynomial generated error-correction decoding apparatus comprising logic gates, a method comprising in combination:
generating code words of a first form compatible with a first field polynomial;
decoding code words of a second form compatible with a second field polynomial selected to reduce the number of said logic gates, said logic gates comprising AND gates and EXCLUSIVE OR gates; and
converting the code words of the first form to code words of the a second form before said code words of the second form are decoded by the decoder.

* * * * *